| United States Patent [19] | [11] Patent Number: 4,894,416 |
| Gallucci | [45] Date of Patent: Jan. 16, 1990 |

[54] LOW GLOSS THERMOPLASTIC BLENDS

[75] Inventor: Robert R. Gallucci, Mt. Vernon, Ind.

[73] Assignee: General Electric Company, Mt. Vernon, Ind.

[21] Appl. No.: 289,938

[22] Filed: Dec. 27, 1988

[51] Int. Cl.$^4$ .............................................. C08L 51/00
[52] U.S. Cl. ...................................... 525/74; 525/902
[58] Field of Search ............................ 525/74, 902, 70

[56] References Cited

U.S. PATENT DOCUMENTS 4,460,742  7/1984  Kishida et al. ........................ 525/64
4,731,414  3/1988  Ting ...................................... 525/71

FOREIGN PATENT DOCUMENTS 225149  12/1983  Japan .

*Primary Examiner*—Theodore E. Pertilla
*Attorney, Agent, or Firm*—Martin Barancik; Joseph Eisele

[57] ABSTRACT

A low gloss thermoplastic with good physical properties consists of a blend of ASA and a gloss-reducing amount of a glycidyl (meth)acrylate copolymer.

11 Claims, No Drawings

LOW GLOSS THERMOPLASTIC BLENDS

BACKGROUND OF THE INVENTION

1. Field of the Invention

This invention relates to blends of acrylate-styrene-acrylonitrile interpolymers (ASA resins) with a particular acrylate resin for gloss reduction.

2. Description of the Prior Art

Molded products made of thermoplastic resins are frequently glossy. For some purposes, this is desirable. However, a matte or non-glossy surface is often preferable for products such as housings for computer terminals, typewriters, miscellaneous electrical appliances and certain automotive parts. There is substantial commercial need for molding resin compositions which are non-glossy.

Elimination of gloss by surface embossing has been practiced but requires a separate step and adds cost. Moreover, subsequent abrasion may remove the embossed matte surface and cause the gloss to reappear. The addition of a delustering agent such as finely-divided silica, silicate, alumina, or other mineral filler has a seriously detrimental effect on the physical properties of the molded object, such as impact strength. Attempts to add a polymeric delustering agent frequently also have deleterious effects on physical properties, not only on impact strength but also on heat distortion temperature, weld line strength, weathering, light stability, and other important properties. The reduction of gloss in certain specified thermoplastic blends by adding a copolymer crosslinked by means of allyl functionality has been described in U.S. Pat. No. 4,460,742.

Acrylonitrile-styrene-acrylate interpolymers (ASA resins) are well known in the art, and have many favorable features such as good strength and outstanding weathering resistance. However, such resins tend to have glossy characteristics, and the same disadvantages as discussed above are observed when conventional methods of reducing gloss are applied to these resins. It is desired to have a means for reducing the gloss in resins predominantly consisting of ASA, while maintaining good physical properties such as strength and weathering resistance.

SUMMARY OF THE INVENTION

The present invention provides low gloss blends of an ASA resin with effective gloss-reducing amounts of a polymer of glycidyl (meth)acrylate, preferably a copolymer of glycidyl (meth)acrylate, the comonomer in this copolymer being at least one comonomer selected from the group consisting of styrene, acrylonitrile, and an alkyl (meth)acrylate.

DETAILED DESCRIPTION OF THE INVENTION

The composition of the invention comprises a blend of:
 (a) from about 90 to about 99.95 weight % (preferably from about 95 to about 99.9 weight %) of an ASA resin; and
 (b) from about 0.05 to about 10 weight % (preferably from about 0.1 to about 5 weight %) of an effective gloss-reducing amount of at least one polymer of glycidyl (meth)acrylate, preferably a copolymer with at least one comonomer selected from the group consisting of styrene, acrylonitrile, and alkyl (meth)acrylates.

More preferably, the copolymer of glycidyl (meth)acrylate is a copolymer with up to about 50 weight glycidyl (meth)acrylate and with at least one comonomer selected from the group consisting of styrene and alkyl (meth)acrylates (i.e. without acrylonitrile). The preferred glycidyl (meth)acrylate is glycidyl methacrylate.

It has been found that such compositions provide substantial reduction in gloss while retaining desirable physical properties such as impact strength, tensile strength, and elongation as well as good aging and weathering properties.

The term (meth)acrylate as used herein is intended to designate both acrylate and methacrylate, i.e. it is equivalent to specifying a acylate chosen from the group consisting of acrylate and methacrylate, and is employed for brevity.

Component (a), an ASA resin (acrylate-styrene-acrylonitrile interpolymer), is a known type of impact-modified substantially-thermoplastic resin which comprises a styrene-acrylonitrile matrix in which is dispersed an acrylate elastomer phase as impact modifier. Advantageous ASA resins which are commercially available comprise a crosslinked (meth)acrylate elastomer, a crosslinked styrene-acrylonitrile copolymer and a substantially linear styrene-acrylonitrile copolymer. Methylated styrenes such as alpha-methylstyrene or vinyltoluene may be used in place of all or part of the styrene, and it is understood that when styrene is mentioned hereinafter, these methylated styrenes are encompassed. The ASA resins can be prepared by a variety of known methods involving emulsion or bulk polymerization. The preferred resins of the ASA type are composed of core-shell impact modifiers in a styrene-acrylonitrile (SAN) matrix. The (meth)acrylate elastomer core portion of these resins may be composed of alkyl, aryl, or arylalkyl esters of acrylic or methacrylic acids. The core shell portion of the resin may be prepared by a two-step process in which the (meth)acrylate elastomer core (which is often slightly crosslinked with polyfunctional vinyl compounds) is covered with a thermoplastic shell of polymethyl methacrylate, polystyrene, styrene-acrylonitrile copolymer, or similar vinyl polymers or copolymers. The compositions may or may not have a comonomer to graft the core shell structure together. These ASA resins may be made for instance by the process of U.S. Pat. No. 3,944,631 (Mar. 1976). The most preferred resins of this group comprise about 15 to about 90% of an uncrosslinked matrix of acrylonitrile-styrene copolymer polymerized and partly grafted on a core-shell impact modifier, typically about 5 to 50% of a crosslinked (meth)acrylate elastomer core with about 15 to about 35% of a crosslinked styrene-acrylonitrile copolymer shell. The crosslinking monomer may be typically a diacrylate of a diol. The shell and core are believed to be linked by having interpenetrating molecular networks, and the term interpolymer is applied to such products having such networks.

Other ASA resins which may be advantageously used in the composition of the invention are the types disclosed in U.S. Pat. Nos. 3,655,824, 3,830,878, 3,991,009, 4,433,102, 4,442,263, and, 4,409,363, all of which are incorporated herein by reference thereto. These ASA resins have in common the use of the three monomers, namely acrylate ester, styrene (or alpha-methylstyrene), and acrylonitrile, to make a thermoplastic with good impact, heat distortion and weathering characteristics. They differ principally in the method of manufacture and in the detailed structure of the essential rubbery phase and the interphases if any. As a class the ASA resins have relatively similar blending properties in view of their outer continuous phase of acrylonitrile-styrene copolymer.

In regard to component polymer (b), this may be the homopolymer of glycidyl (meth)acrylate or, preferably, a copolymer of glycidyl (meth)acrylate and at least one comonomer selected from the group consisting of styrene, acrylonitrile, and alkyl (meth)acrylates (with alkyl other than glycidyl) are known products. In the present invention, it is even more preferable that the comonomer be other than acrylonitrile. A number of copolymers of about 15 to 50 weight % glycidyl methacrylate with styrene and various acrylic monomers are available commercially under the trade name Blemmer Resins, from Nippon Oil & Fats Co. Ltd. and Marubeni Corp. Ltd. (Japan). Variants of these resins where the styrene is substituted with alkyl or halogen are also usable, as are higher homologs of glycidyl methacrylate.

Most broadly, these gloss reducing additives are polymers of the following structure:

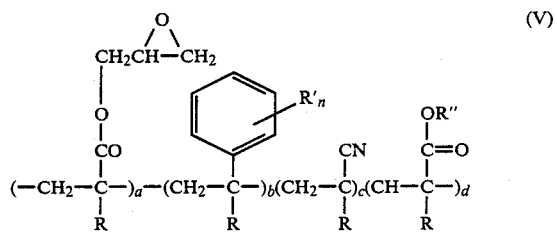

(V)

where R=alkyl (preferably methyl) or hydrogen;
R′=alkyl, hydrogen, or halogen (especially Br) and n=0–5;
R″=alkyl ($\leq$C18), aryl, alkylaryl, or hydrogen;
a=1–100% (preferably 1–50%), b=0–99%, c=0–50% (preferably 0), d=0–50%; and
a+b+c+d=100%

In regard to the polymer (b), the term "polymer" is intended to encompass both homopolymer and copolymers. It is preferred, however, that the polymer (b) be a copolymer with at least one of the comonomers enumerated above, and most preferably that the comonomers be other than acrylonitrile.

These copolymers (V) can be prepared by various and well known techniques for the polymerization of vinyl monomers such as by bulk and emulsion polymerization.

A gloss reducing effective amount of this component (b) is generally found to be in the range of about 0.05 to about 10%, preferably about 0.1% to about 5%, all by weight. Lesser amounts give inadequate gloss reduction, greater amounts are excessively costly and may adversely affect physical properties of the blend or moldings made therefrom.

The blends of the invention may be further modified by the addition of other types of additives known to the art of plastics compounding. Such additives can include fillers (such as clay or talc), reinforcing agents (such as glass fibers), impact modifiers, other resins, plasticizers, flow promoters and other processing aids, stabilizers, colorants, mold release agents, flame retardants, ultraviolet screening agents, and the like.

The production of the compositions of the invention is done by any of the blending operations known for the blending of thermoplastics, such as blending in a kneading machine such as a Banbury mixer or an extruder, or solvent blending. The sequence of addition is not critical but all three main components should be thoroughly blended together.

The invention will be better understood with reference to the following examples, which are presented for purposes of illustration rather than for limitation, and which set forth the best mode contemplated for carrying out the invention.

EXAMPLES 1 to 6

Molding compositions were prepared by melt blending the compositions indicated in the table below in a twin screw extruder at 220°–270° C. and 100–200 rpm. The blended and extruded material was then pelletized, dried and injection molded at about 240° C. to prepare test specimens. The 60o gloss was measured by ASTM test method D-1003 using a Gardner gloss meter. Other physical properties were measured on injection molded samples using the following ASTM test methods: Tensile properties, D638; impact by notched Izod, D256; heat deflection temperature, D648-56 at a load of 18.6 Kg/cm$_2$.

| Example No.: | 1 | 2 | 3 | 4 | 5 | 6 |
|---|---|---|---|---|---|---|
| Composition (wt. %): | | | | | | |
| ASA (note 1) | 100 | 98.5 | 98.5 | 98.5 | 98.5 | 98.5 |
| CP-20SA (note 2) | — | 1.5 | — | — | — | — |
| CP-20MA (note 2) | — | — | 1.5 | — | — | — |
| CP-20S (note 2) | — | — | — | 1.5 | — | — |
| CP-15 (note 2) | — | — | — | — | 1.5 | — |
| CP-50M (note 2) | — | — | — | — | — | 1.5 |
| Properties: | | | | | | |
| 60° gloss | 91 | 75 | 83 | 13 | 26 | 25 |
| Tensile yield, Kpsi | 5.6 | 5.7 | 5.8 | 5.3 | 5.6 | 5.6 |
| Tensile yield, MPa | 38.6 | 39.3 | 40.0 | 36.5 | 38.6 | 38.6 |
| Tensile break, Kpsi | 4.1 | 4.4 | 4.4 | 4.2 | 4.5 | 4.4 |
| Tensile break, MPa | 28.3 | 30.4 | 30.4 | 29.0 | 31.0 | 30.4 |
| Elongation, % | 37 | 14 | 11 | 23 | 17 | 14 |
| ⅛" N. Izod ft lb/in | 5.7 | 3.9 | 3.2 | 8.4 | 8.8 | 7.9 |
| 3.175 mm Izod J/m | 305 | 208 | 171 | 449 | 470 | 422 |
| DTUL at 264 psi °F. | 177 | 178 | 190 | 182 | 190 | 178 |
| DTUL at 1.82 MPa °C. | 81 | 82 | 88 | 83 | 88 | 82 |

Notes to table:
1. Geloy ASA resin 1120 made by General Electric Co.; an interpolymer of acrylonitrile-styrene, polymerized and partly grafted onto an acrylate/styrene elastomer as described in U.S. Pat. No. 3,944,631.
2. Blemmer GMA copolymer resins of Nippon Oil & Fats Co. (Japan) identified as follows: CP-20SA = 20% GMA/styrene/acrylonitrile, Mw 8,100. CP-20MA = 20% GMA/methyl methacrylate/acrylonitrile. Mw 10,000. CP-20S = 20% GMA/ 80% styrene CP-15 = 15% GMA/methyl methacrylate/styrene/alkyl acrylate. Mw 11,400. CP-50M = 50% GMA/ 50% methyl methacrylate, Mw 10,000.

These results show that all of these GMA copolymers had an effect in reducing gloss. The copolymers which do not contain acrylonitrile were relatively more effective.

What is claimed is:

1. A low-gloss thermoplastic blend comprising a core-shell ASA (acrylate-styrene-acrylonitrile interpolymer) resin blended with an effective gloss-reducing amount of at least one polymer of glycidyl (meth)acrylate.

2. A low gloss thermoplastic blend as defined in claim 1 wherein said polymer of glycidyl (meth)acrylate is a copolymer of glycidyl methacrylate with at least one comonomer from the group consisting of styrene, acrylonitrile, and alkyl (meth)acrylates.

3. A low-gloss thermoplastic blend defined in claim 2 wherein said copolymer is present at from about 0.05 to about 10 percent by weight.

4. A low-gloss thermoplastic blend defined in claim 2 wherein said copolymer is present at from about 0.1 to about 5 percent by weight.

5. A low-gloss thermoplastic blend defined in claim 2 wherein said copolymer is a copolymer of glycidyl methacrylate with at least one monomer selected from the group consisting of styrene and alkyl (meth)acrylates.

6. A low-gloss thermoplastic blend defined in claim 1 wherein said ASA resin is a resin having a styrene-acrylonitrile matrix and a core-shell impact modifier of which the shell is styrene-acrylonitrile copolymer and the core is a crosslinked butyl (meth)acrylate rubber.

7. A low-gloss thermoplastic blend defined in claim 6 wherein said ASA resin comprises about 15 to about 90% of an uncrosslinked matrix of acrylonitrile-styrene copolymer polymerized and partly grafted on a core-shell impact modifier which comprises about 5 to 50% of a crosslinked (meth)acrylate elastomer core and about 15 to about 35% of a crosslinked styrene-acrylonitrile copolymer shell.

8. A low-gloss thermoplastic blend defined in claim 1 wherein said glycidyl (meth)acrylate copolymer is a copolymer of about 20 weight percent glycidyl methacrylate with about 80 weight percent of styrene.

9. A low-gloss thermoplastic blend defined in claim 1 wherein said glycidyl (meth)acrylate copolymer is a copolymer of about 50 weight percent glycidyl methacrylate with about 50 weight percent methyl methacrylate.

10. A low-gloss thermoplastic blend defined in claim 1 wherein said glycidyl (meth)acrylate polymer is a copolymer of about 15 weight percent glycidyl methacrylate with styrene and an alkyl (meth)acrylate.

11. A low gloss thermoplastic blend which comprises:
  (a) from about 95 to about 99.1 weight % of an ASA resin having a styrene-acrylonitrile matrix and a core-shell impact modifier of which the shell is styrene-acrylonitrile copolymer and the core is a crosslinked butyl (meth)acrylate rubber; and
  (b) from about 5 to about 0.1 weight % of a copolymer of about 15 to about 50% glycidyl methacrylate copolymerized with at least one monomer selected from the group consisting of methyl methacrylate, styrene and an alkyl (meth)acrylate.

* * * * *